United States Patent [19]

Smith

[11] Patent Number: 5,001,435
[45] Date of Patent: Mar. 19, 1991

[54] LUBRICATION FILM THICKNESS MEASURING SYSTEM AND METHOD

[75] Inventor: Dennis W. Smith, Phoenix, Ariz.
[73] Assignee: Honeywell Inc., Minneapolis, Minn.
[21] Appl. No.: 42,754
[22] Filed: Apr. 27, 1987
[51] Int. Cl.$^5$ .................. G01R 27/26; G01N 33/30
[52] U.S. Cl. .................................. 324/671; 324/683; 340/631; 73/64
[58] Field of Search ........... 324/61 R, 61 QL, 61 QS, 324/662, 663, 671, 674, 683; 340/682, 631; 73/10, 64

[56] References Cited

U.S. PATENT DOCUMENTS

| | | | |
|---|---|---|---|
| 4,345,203 | 8/1982 | Vermeiren et al. | 324/61 R |
| 4,471,295 | 9/1984 | Vermeiren | 324/61 R |
| 4,511,837 | 4/1985 | Vermeiren et al. | 324/61 R |
| 4,675,596 | 6/1987 | Smith | 324/61 QS |
| 4,728,943 | 3/1988 | Vermeiren | 340/682 |
| 4,733,556 | 3/1988 | Meitzler et al. | 340/631 |

Primary Examiner—Reinhard J. Eisenzopf
Assistant Examiner—Jack B. Harvey
Attorney, Agent, or Firm—Howard Paul Terry

[57] ABSTRACT

A lubricating film thickness measuring system and method includes a rolling element bearing having a relatively rotatable electrically insulated inner and outer races forming a raceway therebetween. Rolling elements are movably mounted in the raceway. Apparatus is provided for measuring capacitance across the bearing. The measuring apparatus includes an oscillator circuit and a phase detection circuit and is responsive to a phase angle shift between a first signal going from an oscillator circuit to the bearing and from the bearing to the phase detection circuit, and a second signal received by the phase detection circuit directly from the oscillator circuit. The method involves applying a predetermined electrical signal across the rolling elements and measuring the capacitance across the rolling elements thereby providing a measure of the lubricating film thickness.

3 Claims, 3 Drawing Sheets

LUBRICATION FILM THICKNESS MEASURING SYSTEM AND METHOD

BACKGROUND OF THE INVENTION

1. Field of the Invention

This invention relates generally to a lubricating film thickness measuring system and method and more particularly to capacitive measurement of elastohydrodynamic film thickness in a rolling element bearing.

2. Description of the Prior Art

In lubrication systems particularly for gyroscopic applications, it is often desirable to maintain minimum drag torque and consistent performance over long periods of time. Increases in life requirements for lubricated parts have motivated the search for a lubrication system that would provide a constant amount of lubricating medium over a long period of time. In bearings, it is critical to provide a substantially exact amount of oil between the frictional surfaces since excessive oil has been shown to cause high drag torques due to excessive viscous drag, reduced stability of the rolling element retainer (the cage) and increased emitted vibration. Insufficient oil produces a thinner elastohydrodynamic film which leads to higher friction, increased wear and, consequently, premature bearing failure.

In a system of providing oil to a running, rolling element bearing through the use of an active control system which monitors oil requirements and injects oil when necessary, known as an active, autonomous oil lubrication system, it is necessary to know what the operating elastohydrodynamic (EHD) film thickness is in a ball bearing under various conditions. EHD film refers to the film of lubricating oil developed between a rolling element and a raceway of an operating rolling element bearing. The required technique had to provide accurate measurement, in an absolute sense, of the EHD film thickness so that minimum lubrication requirements could be established, as well as variations in other bearing dynamics as a function of film thickness changes. Attempts to use conventional film thickness measuring techniques resulted in data that was erratic, non-repeatable and generally unsatisfactory.

One conventional technique is to measure resistance across an operating rolling bearing to determine EHD film thickness. If a constant current is applied from the inner to the outer races for a rolling element bearing, the voltage across the bearing will change as a function of a resistance and the resistance will change as a function of EHD film thickness since the lubricating oil has a high dielectric constant. In an operating bearing a lubricant film is generated between the rolling elements and the raceways. The dielectric constant of the oil is high so even a thin film produces a very high resistance. However, the surfaces of the rolling elements and the raceways are not perfect so surface asperities periodically approach each other and when this happens the resistance becomes momentarily very low. This effect produces a very low signal to noise ratio when operating in the thin film regime, which is where the most critical data must be obtained.

The primary problem in using the resistance measurement across the operating bearing to establish the EHD film thickness is that the resistance path between the two races varies with time, due to the dynamics of the ball and the microscopic surface finishes of the ball and races. These resistance variations cause very high noise levels in the data and makes it very difficult to establish a mean resistance value that would relate to film thickness. Another problem with the resistance measuring technique is that, since the oil has a very low conductivity, as the film is established the resistance becomes very high and it doesn't change significantly with small changes in the film thickness. Since the regime of interest is where the film is fully developed, that is where there is no contact between the balls and races, the resistance measuring technique is not optimum.

The foregoing illustrates limitations known to exist in the present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a lubricating film thickness measuring system including a rolling element bearing having a rotatable shaft extending into an associated housing. An electrically insulated inner race is engaged for rotation with the shaft in the housing and an electrically insulated, stationary outer race is also mounted in the housing thus forming a raceway with the inner race. Rolling elements are movably mounted in the raceway. Means are provided for measuring capacitance across the bearing.

The foregoing and other aspects will become apparent from the following detailed description of the invention when considered in conjunction with the accompanying drawing. It is to be expressly understood, however, that the drawing is not intended as a definition of the invention but is for the purpose of illustration only.

DESCRIPTION OF THE PREFERRED EMBODIMENT

Figure 1:
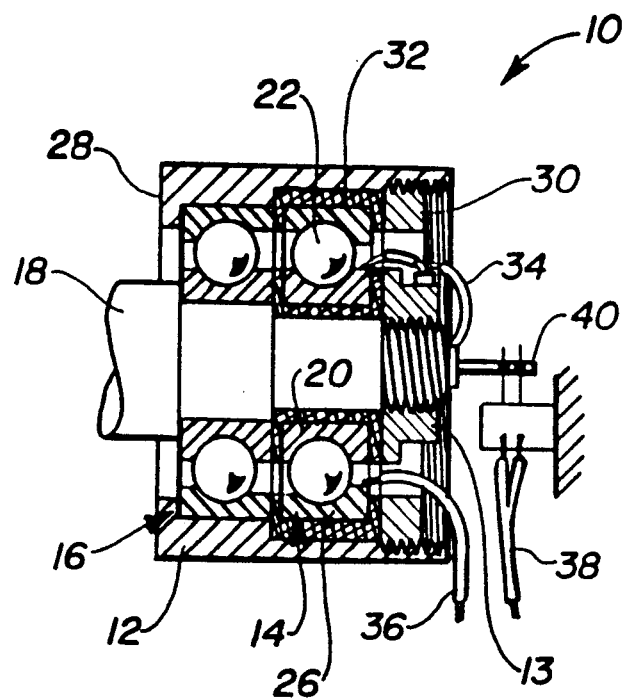
FIG. 1 is a cross-sectional view illustrating an embodiment of a ball bearing cartridge, modified to allow capacitance measurements across one of the bearings.

In FIG. 1, a double row ball bearing is generally designated 10 and is contained within a cartridge or housing 12. A first bearing set 14 and a second bearing set 16 have an externally driven shaft 18 extending therethrough. Since bearing sets 14, 16 are similar, only one is described in detail. Shaft 18 extends through the housing 12 and is secured at 13 to rotatably drive an inner race 20. A plurality of rolling elements, such as ball bearings 22, rotate in a raceway defined between the inner rotating race 20 and an outer stationary race 26. It should be noted that shaft 18 and inner race 20 may be stationary and outer race 26 may rotate relative thereto. Bearing sets 14, 16 are secured in side-by-side relationship within housing 12 between a flange 28 and a retainer ring 30.

The capacitance between the inner and outer races of a rotating rolling element bearing is an exponential function of the EHD film thickness. The total capacitance can be modeled as a network of parallel and series capacitors where the oil is the dielectric and the rolling elements and raceways act as conductive plates. One of the advantages of using capacitance as a sensing parameter rather that resistance is the effect of surface asperities and irregularities. If any asperity or surface irregularity reduces the minimum distance between the surfaces, even in a local area, the resistance can drop considerably, producing a noise spike. A similar asperity will cause a much smaller change in the capacitance since capacitance is a function of the surface area as well as the distance between the surfaces.

To effect this technique the bearing must be electrically isolated. FIG. 1 illustrates an embodiment for making a film thickness measurement using a capacitive technique. Ball bearings 22 are electrically insulated from its housing 12 and shaft 18 by insulators 32. A high frequency signal is applied to the inner and outer races 20, 26, respectively through an inner and outer connecting wire 34 and 36, respectively. In this example, outer race 26 is stationary and the inner race 20 rotating so, the signal from the rotating inner wire 34 is connected to a stationary output wire 38 through a rotating electrical transfer device such as a slip ring 40 as shown.

Figure 2:
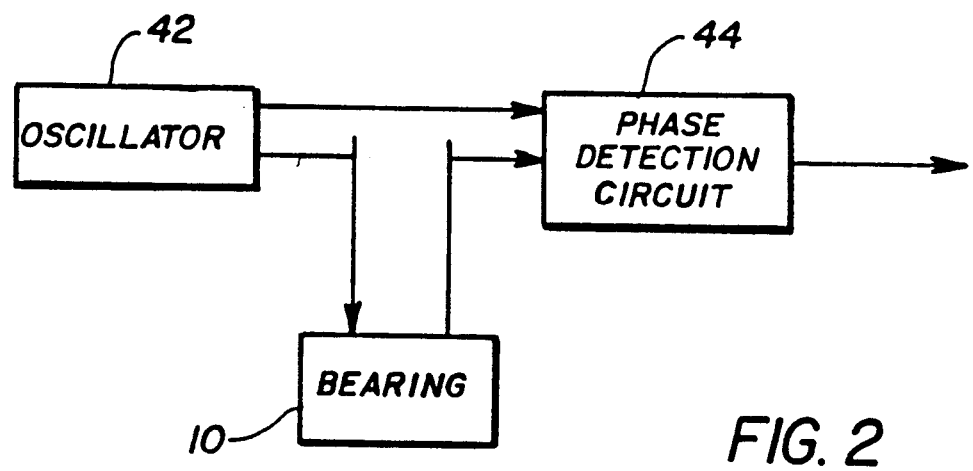
FIG. 2 is a block diagram illustrating an embodiment of a capacitive measurement system.

FIG. 2 is a block diagram of one possible measurement system. The output of a 3 MHz oscillator 42 is input to a phase detection circuit 44 directly and through ball bearing 22 (shown in FIG. 1) of bearing 10. The phase detection circuit 44 measures the phase angle shift between the oscillator 42 output signal and the signal from bearing 22 and provides an output voltage that is proportional to the phase angle shift. Since the phase angle shift is a function of the capacitance across the bearing which is a function of EHD film thickness, the output voltage from phase detection circuit 44 is proportional to the EHD film thickness.

Figure 3:
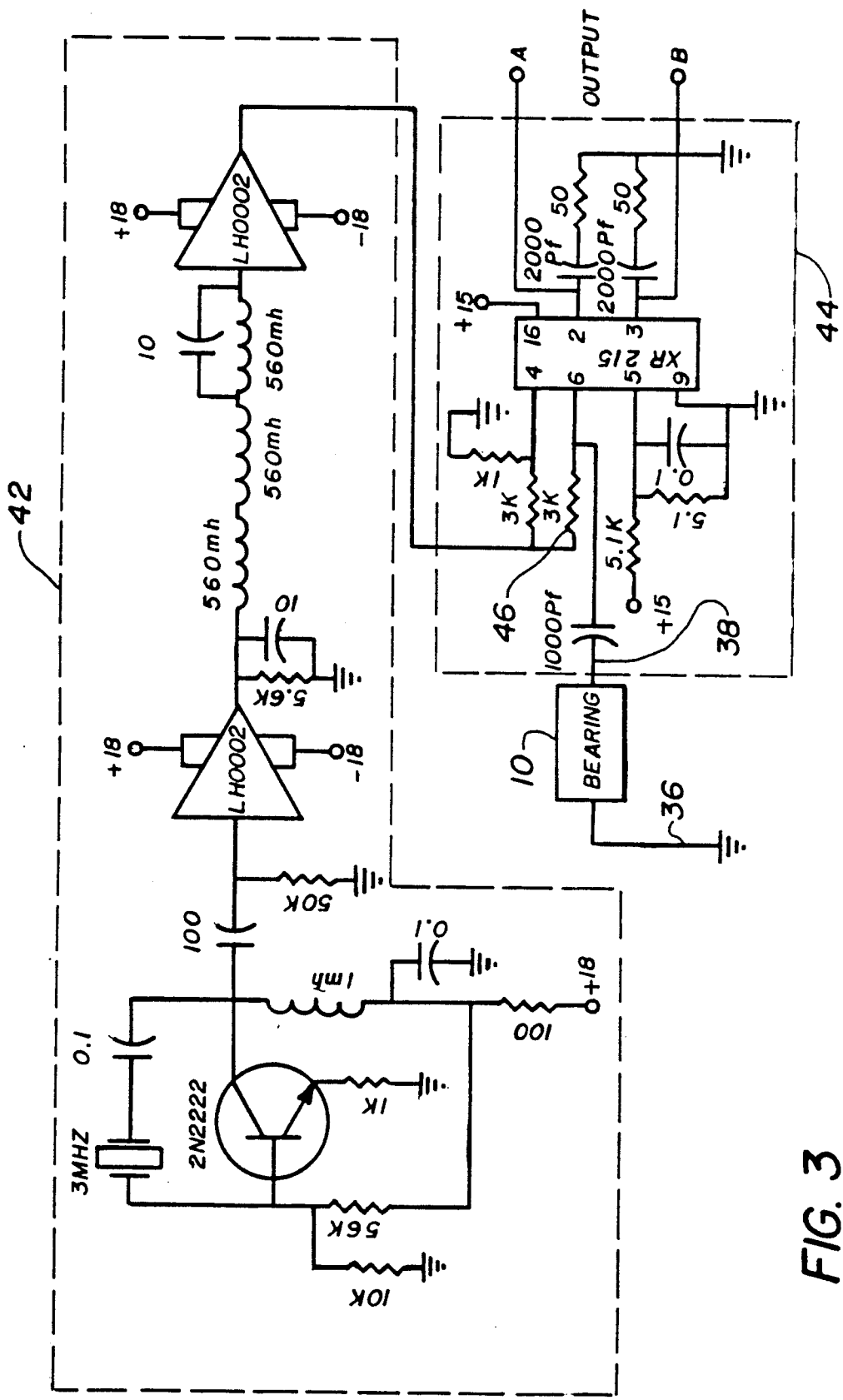
FIG. 3 is a schematic diagram illustrating an embodiment of a capacitive EHD film measurement system circuit.

FIG. 3 is an exemplary embodiment of an electronic schematic illustrating one of the possible systems that will perform the functions outlined in FIG. 2. Wire 36 of FIG. 1 is connected to the circuit of FIG. 3 on the ground side of bearing 10, and wire 38 is connected at the 1000 Pf capacitor the opposite side of bearing 10.

The phase angle difference between the high frequency signal from oscillator 42 and a signal that has passed through the bearing, is caused by the impedance within the bearing, particularly the capacitance. Equation 1 relates the phase angle shift to the real and imaginary components of impedance.

$$\theta = \tan^{-1} \frac{Z_{REAL}}{Z_{IMAGINARY}} \quad (EQ1)$$

The imaginary component ($Z_{IMAGINARY}$) is associated with the capacitative impedance, which is the inverse of the reactance.

The real component ($Z_{REAL}$) is associated with the resistive impedance and is primarily due to a fixed resistor 46 that is placed in series with the bearing, but also includes the resistance across the bearing as well. FIG. 3 shows this fixed resistor 46 as a 3K Ohm resistor but the actual value may be different for different applications.

The schematic illustrated in FIG. 3 is only one possible configuration that will perform the desired measurement. Resistor 46 can range from 2K to 4K Ohms and provide acceptable performance in the described circuit. "Different applications" refers to the use of this circuit with significantly different size or configuration, such as roller bearings. Three MHz was selected as the oscillator frequency because it is high enough to avoid distortion, yet, low enough to provide acceptable gain. Any voltage monitoring device, such as a VOM, strip chart recorder or oscilloscope may be used to monitor the output of phase detection circuit 44.

Figure 4:
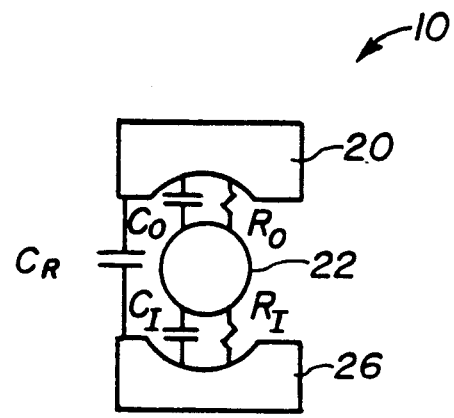
FIG. 4 is a symbolic representation illustrating an embodiment of an electrical circuit schematic of an individual rolling element of a bearing.

FIG. 4 shows a symbolic representation of a rolling element bearing 22 in cross section with the location of the significant capacitance and resistance values referenced.

Figure 5:
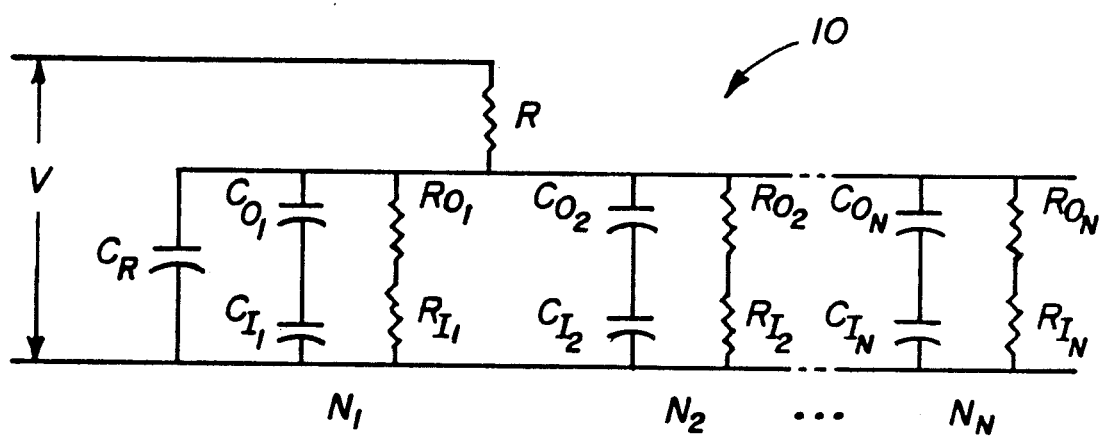
FIG. 5 is a diagram illustrating an embodiment of a circuit schematic of an entire bearing having N rolling elements.

FIG. 5 is an equivalent circuit schematic for the whole bearing using the notation presented in FIG. 4, assuming N rolling elements.

The phase angle ($\theta$) can be calculated, as in Equation 1 by dividing the impedance of the fixed resistor 46 by the total impedance across the bearing. Equations 2 and 3 are typical representations of the fixed resistor impedance and the bearing impedance respectively, where N is the number of rolling elements and W (Omega) is the frequency of the signal from oscillator 42.

$$Z_{REAL} = R(46) \quad (EQ2)$$

$$Z_{IMAG} = \frac{(R_O + R_I) + W^2(C_O + C_I)}{NW^2[(C_O + C_I)^2 - C_O C_I(R_O + R_I)^2] + JWC_R[(R_O + R_I)^2 + W^2(C_O + C_I)^2] + (C_O + C_I)(R_O + R_I)(W^2 C_O C_I + 1)} \quad (EQ3)$$

$C_R$ = Capacitance between inner race 20 and outer race 26 exclusive of the rolling elements 22.

$C_I$ = Capacitance between rolling element 22 and inner race 20.

$C_O$ = Capacitance between rolling element 22 and outer race 26.

$R_I$ = Resistance between rolling element 22 and inner race 20.

$R_O$ = Resistance between rolling element 22 and outer race 26.

Expressions for the resistances, $R_O$ and $R_I$, and the capacitances $C_O$ and $C_I$ between the rolling elements 22 and the raceway, as well as the capacitance between the inner and outer races 20, 26 respectively, vary with the type of bearing, various geometric parameters, the material of the cage (if one is used), the properties of the lubricant and the EHD film thickness.

Besides being useful as a research tool, measuring the EHD film thickness under various controlled conditions, this EHD film thickness measurement technique can be used to monitor the lubrication of an operating bearing. This is useful data for determining the physical condition of a bearing, the need for additional lubrication, oil or grease, or as a lubrication sensor for an active lubrication system. This technique could also be used to measure the film thickness in certain hydrostatic bearings, gas or liquid where the voltage could be applied between the moving and stationary elements. It would serve as a film/no film indicator but would not supply quantitative data on the film thickness.

The foregoing has described a system and method for measuring the EHD film thickness of an operating rolling element bearing by measuring the capacitance across the bearing. This capacitance is developed between the rolling elements and raceways with the oil film providing high dielectric separation.

The advantage of the capacitance measuring system and method is that the capacitance is measurable in the regime of interest, mainly the fully developed EHD film regime, and the capacitance changes significantly with very small changes in film thickness.

The capacitance between the inner and outer race of an operating bearing is an exponential function of the EHD film thickness. The total capacitance can be modeled as a series of parallel and series capacitors where the oil film is a dielectric and the rolling elements and raceways act as the conductive plates, see FIG. 5. A mathematical model was developed that related EHD film thickness to capacitance across the bearing. The capacitance across an operating bearing is measured by passing a high frequency electrical signal between the inner and outer race of the bearing. The capacitance of the bearing causes a phase angle shift between the signal going and the signal coming out of the bearing. This shift is measured and an analog output, proportional to the phase shift, is produced. A mathematical model, relating EHD film thickness with the capacitance across the bearing and subsequently with the phase shift due to this capacitance, is used to relate the measured phase angle with the actual EHD film thickness.

While the invention has been described in its preferred embodiments, it is to be understood that the words which have been used are words of description rather than limitation and that changes may be made within the purview of the appended claims without departing from the true scope and spirit of the invention in its broader aspects.

Having thus described the invention, what is claimed is:

1. A lubricating film thickness measuring system comprising:
   rolling element bearing means having relatively rotatable inner and outer races defining .a raceway therebetween:
   a plurality of lubricated rolling elements movable in said raceway in response to relative rotational movement between said inner and outer races; and
   means coupled to the bearing means for measuring capacitance across said rolling elements; wherein said measuring means includes an oscillator circuit and a phase detection circuit; and wherein said inner race is an all metal race and is electrically insulated; said outer race is an all metal race and is electrically insulated; and said measuring means includes a first connection to said inner face and a second connection to said outer race; and including a rotating electrical transfer member interconnecting said measuring means and said first connection; and wherein said measuring means is responsive to a phase angle shift between a first signal going to the bearing from the oscillator circuit and from the bearing to the phase detection circuit, and a second signal received by the phase detection circuit directly from the oscillator circuit; and wherein the first signal to and from the bearing passes through the first connection and inner race and an inner film portion and a rolling element and an outer film portion and the outer race and the second connection.

2. A lubricating film thickness measuring system comprising:
   a rolling element bearing having a rotatable shaft extending into an associated housing;
   an electrically insulated inner race of all metal construction engaged for rotation to said shaft in said housing;
   an electrically insulated, stationary outer race of all metal construction mounted in said housing, said inner and outer races defining a raceway; and
   means coupled to the bearing for measuring capacitance across said bearing; wherein said measuring means includes an oscillator circuit and a phase detection circuit and said measuring means is responsive to a phase angle shift between a first signal going to the bearing from the oscillator circuit and from the bearing to the phase detection circuit, and a second signal received by the phase detection circuit directly from the oscillator circuit; and wherein said measuring means includes a first connection to said inner race, a second connection to said outer race, and a rotating electrical transfer member interconnecting said measuring means to said first connection; and wherein the first signal to and from the bearing passes through the first connection and inner race and an inner film portion and a rolling element and an outer film portion and the outer race and the second connection.

3. The method of measuring a lubricating film thickness which is a sum of inner and outer lubricating film thickness disposed on inner and outer sides of rolling bearing element means having relatively rotatable inner and outer races defining a raceway therebetween with a plurality of lubricated rolling bearing elements moveable in said raceway including the steps of:
   applying an internal electrical signal across said inner lubricating film thicknesses and said rolling bearing elements and said outer lubricating film thicknesses
   measuring the total capacitance across said inner lubricating film thicknesses and said rolling bearing elements and said outer lubricating film thicknesses;
   measuring the phase angle shift of said internal electrical signal;
   generating a first electrical signal having a predetermined frequency;
   applying said first electrical signal across said inner and outer races for applying said internal electrical signal and for providing a second electrical signal having a phase angle shift; and
   comparing said first and second electrical signals to provide a measure of the lubricating film thickness.

* * * * *